Oct. 11, 1949.    G. G. ELLNER    2,484,559
IRRADIATING APPARATUS

Filed Aug. 2, 1945    2 Sheets-Sheet 1

INVENTOR.
GEORGE G. ELLNER.
BY
ATTORNEY.

Oct. 11, 1949.   G. G. ELLNER   2,484,559
IRRADIATING APPARATUS
Filed Aug. 2, 1945   2 Sheets-Sheet 2
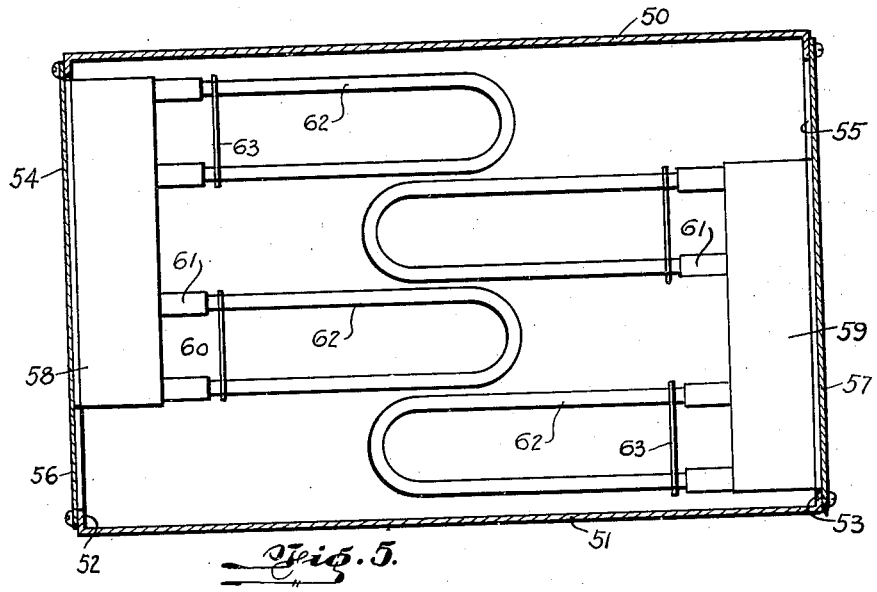
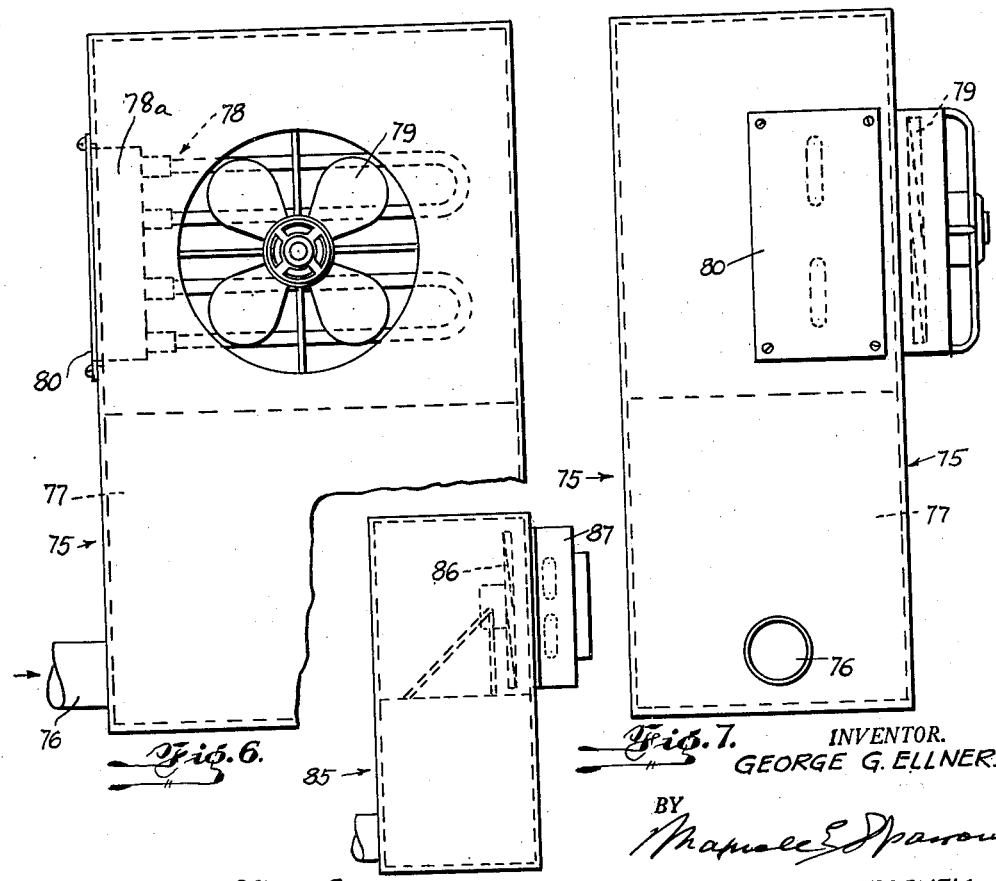
INVENTOR.
GEORGE G. ELLNER
BY
ATTORNEY.

Patented Oct. 11, 1949

2,484,559

UNITED STATES PATENT OFFICE 2,484,559

IRRADIATING APPARATUS

George G. Ellner, Long Island, N. Y.

Application August 2, 1945, Serial No. 608,498

1 Claim. (Cl. 250—43)

This invention relates generally to the application of ray-emission means and has further reference to that class of devices employing electrical lamps, tubes or similar instrumentalities which generate the bactericidal band of the ultra-violet spectrum for destroying or appreciably reducing the number of bacteria, molds, yeasts, algae, virus and other micro-organisms or other undesirable germs, and for other germicidal or sterilizing purposes, and to possibly replace pasteurization, heat or chemical sterilization. It has more particular reference to devices employing tubular gaseous lamps or mercury discharge devices, such as, in conditioning units through which air or gaseous substances are made to flow for irradiating such fluids.

It is an object of the present invention to provide ray-emission means installed in conditioning units for irradiating the fluid passing therethrough, and thereby making the same sterile.

It is a further object of the present invention to introduce into an air conditioning duct, irradiating means providing sterilizing, bactericidal or other types of ultra-violet rays, infra-red or other rays.

A still further object of the present invention is to provide an irradiating unit which may be easily applied to an air-conditioning or like device and easily removed therefrom for replacement or repair purposes.

Where the invention is applied to ducts of airconditioning devices, an opening is made in the duct and the irradiating unit is projected through the said opening, a flange being provided on the device which covers said opening, the flange being secured to a wall of the duct. The irradiating unit contains the transformer, a ballast or other electrical control for the lamps or tubes which project within the duct, and in one form of the invention, the lamps or tubes are separately removable from the irradiating unit for replacement or repair purposes.

The above and other objects and advantages of the invention will appear as the description proceeds. To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all of the views, of which:

Fig. 5 is a cross-sectional view through an air duct;

Fig. 6 is a front elevation partly broken away of an air conditioning unit incorporating the invention;

Fig. 7 is a left-hand end view of Fig. 6; and

Fig. 8 is a view similar to Fig. 7, showing an air conditioning unit embodying the invention in a modified form.

Figure 1:
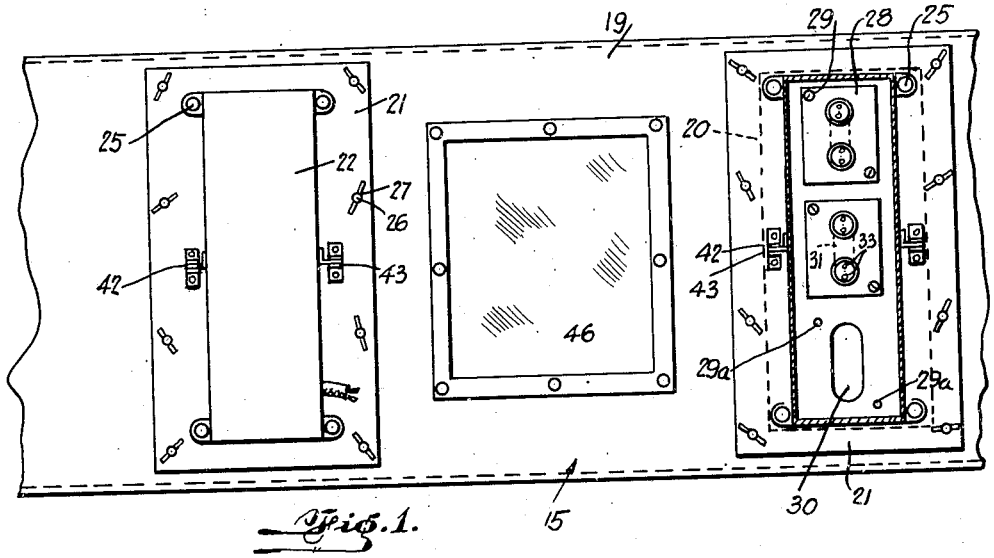
Fig. 1 is a front-elevational view of a portion of an air duct utilizing the invention.
Figure 2:
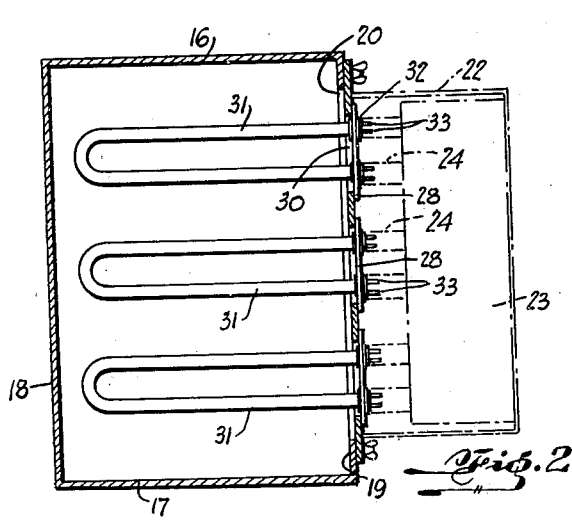
Fig. 2 is a sectional view taken on line 2—2 of Fig. 1.
Figure 3:
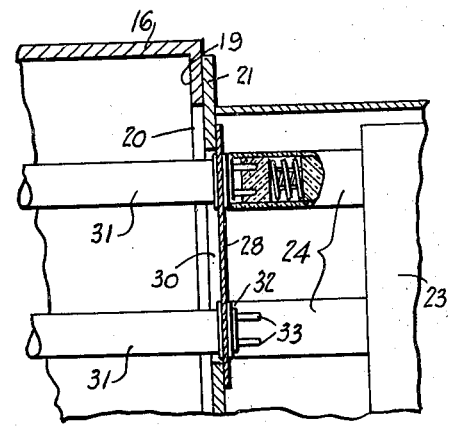
Fig. 3 is an enlarged sectional view of the upper right-hand corner of Fig. 2.
Figure 4:
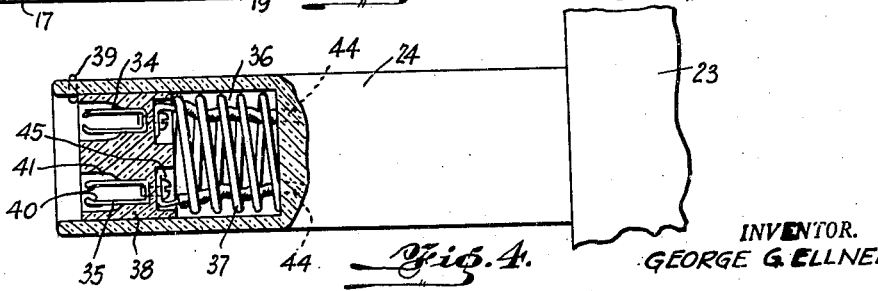
Fig. 4 is a full size view partly in section of a socket element employable in the invention.

Referring to the drawings, the air duct 15 consisting of the four walls 16, 17, 18 and 19, has the front wall 19 provided with opening 20. Over opening 20 is a plate 21 on which is mounted the box-like structure 22 containing an electrical control, such as, a transformer 23 and a plurality of sockets 24. Transformer housing 22 is removably secured to the plate 21 by bolts 25. Plate 21 is secured over opening 20 to wall 19 by a plurality of fastening means, such as, wing nuts 26 engaging studs 27 on the front wall 19. Secured to plate 21 by bolts 29 is also a plurality of removable panels 28 on which are mounted the tubes 31. Plate 21 is provided with holes 29a receiving the bolts 29. A plurality of elongated openings 30 are also provided in plate 21 to receive the U-shaped irradiating tubes 31. Tubes 31 are constructed in a manner similar to the tubes disclosed in my copending application, Serial Number 484,156, filed April 23, 1943, now Patent 2,425,672, and therefore, being provided with the panels 28 and locking flanges 32.

The electrical contact prongs 33 are provided to engage spring members 34 and 35 in sockets 24. Sockets 24 are secured in a conventional manner to transformer box 23 and each has a recess 36 in which is located a helical spring 37 pressing against clip member 38 causing the latter to be forced outward. A stop screw 39 prevents member 38 from coming out too far. The flexible portions 40 of members 35 are adjacent to recesses 41 in the insulated members 38, thus permitting the spreading of the members 40 when passed over the contact pins 33 during assembly of the unit to the air conditioning duct.

It is understood, however, that any other socket or contact means may be employed in lieu of socket 24. In the use of conventional sockets used for fluorescent type lighting, it would be necessary to provide an intermediary plate between the transformer housing 23 and the plate 21, with the sockets flexibly attached so as to permit accessibility for securing the sockets to the tubes. Thus, the transformer housing, although removed from operating position to permit accessibility to sockets and lamps, may or may not be electrically disconnected therefrom.

To facilitate the contacting of the clip members 40 and the contact pins 33 during assembly, guide bars 42 may be provided against transformer housing 22, the same to engage complementary female guide bars 43 secured to plate 21. Electrical wires 44 conventional in devices of this type, may be secured by screws 45 to clip members 34, 35.

To facilitate the observation of the tubes 31 and the air currents passing through the duct 15, a window 46 is preferably located at suitable distances from the irradiating units or similar windows may be provided in the plates 21.

Referring to Fig. 5, the air duct comprises upper wall 50, lower wall 51, and side walls 52, 53. Side walls 52, 53 have openings 54, 55, respectively therein, which said openings are covered by plates 56, 57, electrical controls being contained in housings 58, 59 secured to the inside faces of the covers 56, 57. Units 58, 59 are also provided with conventional sockets 60, 61 into which are inserted the ends of U-shaped irradiating tubes 62. Tubes 62 may be provided with reinforcing panels 63. It is understood that the sockets 61 may be contained within housing 58 or 59.

It can be readily seen that the invention particularly in the embodiment of Fig. 5, is applicable to devices other than air-conditioning units, such as, for example, tanks, receptacles, rooms or compartments; and may be employed as a portable sterilizing unit to be placed in an environment to be irradiated.

As shown in Figs. 6 and 7, a conventional air-conditioning unit 75 having the air inlet 76 and the conventional air-conditioning compartment 77 may be provided with an irradiating device 78 immediately behind the electric fan 79, thus causing the air flowing from air-conditioning unit 77 to fan 79 to pass the irradiating unit 78 for sterilizing and conditioning purposes. In this instance, the unit 78 is mounted on the cover plate 80 readily removable for conditioning and repair purposes. It is understood that the housing 78a may be contained within the unit 75, if desired.

As shown in Fig. 8 a similar air-conditioning unit 85 having its blower fan 86 mounted inside the unit 85, may have an irradiating unit 87 added on the outside surface of the cabinet in such a manner as to be readily removable and exchangeable.

It will thus be seen that there has been provided by this invention devices in which the various objects hereinabove set forth, together with many thoroughly practical advantages, are successfully achieved.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

An irradiating unit insertable into a duct having an opening, comprising a plate adapted to cover said opening, said plate having at least one elongated slot, a U-shaped irradiating tube fitting into said slot, a panel secured to the ends of said tube and adapted to cover said slot, each of said ends having a set of terminals extending through said panel, an electrical control for said tube, at least one pair of sockets on said control each engageable with a respective one of said sets of terminals, a housing fitting over said control, means including said housing for detachably securing said control to said plate with said sockets and terminal sets in electrical and mechanical engagement, and guide means on said housing and cooperating guide means on said plate for insuring correct positioning of said sockets relative to said terminal sets.

GEORGE G. ELLNER.

REFERENCES CITED

The following references are of record in the file of this patent:

UNITED STATES PATENTS

| Number | Name | Date |
|---|---|---|
| 2,248,618 | Fischer | July 8, 1941 |
| 2,273,449 | Plishker | Feb. 17, 1942 |
| 2,347,954 | Kiely | May 2, 1944 |
| 2,413,704 | Glatthar et al. | Jan. 7, 1947 |